United States Patent
Ahn et al.

(10) Patent No.: US 8,927,062 B2
(45) Date of Patent: Jan. 6, 2015

(54) METHOD OF PREPARING A SUBSTRATE WITH A COMPOSITION INCLUDING AN ORGANOBORANE INITIATOR

(71) Applicant: Dow Corning Corporation, Midland, MI (US)

(72) Inventors: Dongchan Ahn, Midland, MI (US); Kevin Wier, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/740,864

(22) Filed: Jan. 14, 2013

(65) Prior Publication Data
US 2013/0129996 A1    May 23, 2013

Related U.S. Application Data

(62) Division of application No. 12/258,139, filed on Oct. 24, 2008, now Pat. No. 8,377,852.

(60) Provisional application No. 60/983,014, filed on Oct. 26, 2007.

(51) Int. Cl.
| | | |
|---|---|---|
| *C09D 5/00* | (2006.01) | |
| *B01J 19/00* | (2006.01) | |
| *C40B 40/14* | (2006.01) | |
| *C40B 50/18* | (2006.01) | |
| *C40B 60/08* | (2006.01) | |

(52) U.S. Cl.
CPC ............... *C09D 5/00* (2013.01); *B01J 19/0046* (2013.01); *C40B 40/14* (2013.01); *C40B 50/18* (2013.01); *C40B 60/08* (2013.01); *B01J 2219/00378* (2013.01); *B01J 2219/00527* (2013.01); *B01J 2219/00585* (2013.01); *B01J 2219/00596* (2013.01); *B01J 2219/00603* (2013.01); *B01J 2219/0061* (2013.01); *B01J 2219/00659* (2013.01); *B01J 2219/00689* (2013.01); *B01J 2219/00736* (2013.01); *B01J 2219/00756* (2013.01)
USPC ........................................................ 427/256

(58) Field of Classification Search
None
See application file for complete search history.

(56) References Cited

U.S. PATENT DOCUMENTS

| | | | |
|---|---|---|---|
| 2,676,182 | A | 4/1954 | Daudt et al. |
| 3,275,611 | A | 9/1966 | Mottus et al. |
| 4,584,355 | A | 4/1986 | Blizzard et al. |
| 4,585,836 | A | 4/1986 | Homan et al. |
| 4,591,622 | A | 5/1986 | Blizzard et al. |
| 5,929,194 | A | 7/1999 | Woo et al. |
| 6,416,861 | B1 | 7/2002 | Lee et al. |
| 6,620,515 | B2 | 9/2003 | Feng et al. |
| 6,706,831 | B2 | 3/2004 | Sonnenschein et al. |
| 6,710,145 | B2 | 3/2004 | Sonnenschein et al. |
| 6,762,260 | B2 | 7/2004 | Sonnenschein et al. |
| 6,777,512 | B1 | 8/2004 | Sonnenschein et al. |
| 6,806,330 | B1 | 10/2004 | Sonnenschein et al. |
| 6,808,738 | B2 * | 10/2004 | DiTizio et al. ............... 427/2.24 |
| 7,247,596 | B2 | 7/2007 | Jialanella et al. |
| 2002/0161065 | A1 * | 10/2002 | DiTizio et al. ..................... 522/1 |
| 2004/0028815 | A1 * | 2/2004 | Castellano et al. ........... 427/282 |
| 2006/0211187 | A1 | 9/2006 | Choi et al. |
| 2007/0014126 | A1 | 1/2007 | Kuo et al. |
| 2007/0141267 | A1 | 6/2007 | Sonnenschein et al. |
| 2010/0221429 | A1 * | 9/2010 | Ahn .............................. 427/256 |

FOREIGN PATENT DOCUMENTS

| | | | |
|---|---|---|---|
| WO | WO 2006/073695 | A1 | 7/2006 |
| WO | WO 2007/040794 | A1 | 4/2007 |
| WO | WO 2007/044735 | A2 | 4/2007 |

OTHER PUBLICATIONS

Yoshioka et al., "Simple Modification of Sheet Resistivity of Conducting Polymeric Anodes via Combinatorial Ink-Jet Printing Techniques", Macromolecular Rapid Communications, 2005, 26, pp. 238-246.

de Gans et al., "Inkjet Printing of Polymer Micro-Arrays and Libraries: Instrumentation, Requirements, and Perspectives", Macromolecular Rapid Communications 2003, 24, No. 11, pp. 659-666.

Zhang et al., "Combinatorial and high-throughput approaches in polymer science", Institute of Physics Publishing, Measurement Science and Technology 16 (2005) pp. 203-211.

Wallace et al., "Ink-Jet Methods in Combinatorial Materials Synthesis", High-Throughput Analysis, 2003, pp. 469-490, Kluwer Academic Publishers, New York.

* cited by examiner

*Primary Examiner* — Karlheinz R Skowronek
*Assistant Examiner* — Lianko Garyu
(74) *Attorney, Agent, or Firm* — Howard & Howard Attorneys PLLC

(57) ABSTRACT

A method of preparing a substrate with a composition comprising (i) an organoborane initiator and (ii) a radical curable component disposed thereon includes the step of depositing the composition onto the substrate wherein at least one of (i) the organoborane initiator and (ii) the radical curable component is deposited onto the substrate in the form of a gradient pattern. An article comprises the substrate and the gradient pattern formed on the substrate. The gradient pattern is formed from a developed composition comprising the reaction product of (i) the organoborane initiator and (ii) the radical curable component. By forming the gradient pattern on the substrate, combinatorial and high-throughput methods of generating and testing the developed composition are possible, which enable characterization of the developed composition for various physical and chemical properties.

22 Claims, 3 Drawing Sheets

METHOD OF PREPARING A SUBSTRATE WITH A COMPOSITION INCLUDING AN ORGANOBORANE INITIATOR

RELATED APPLICATIONS

This application is a divisional of, and claims priority to, U.S. patent application Ser. No. 12/258,139 filed on Oct. 24, 2008, which claims priority to U.S. Provisional Application No. 60/983,014, filed on Oct. 26, 2007.

FIELD OF THE INVENTION

The present invention generally relates to a method of preparing a substrate. More specifically, the present invention is directed to a method of preparing a substrate with a composition including reactive components disposed thereon in the form of a gradient pattern.

DESCRIPTION OF THE RELATED ART

Recently, combinatorial and high-throughput methods of generating and testing chemical compounds have attracted the attention of both industry and academia due to the potential for increasing productivity and reducing production costs associated with research and development. As is known in the art, combinatorial chemical synthesis includes creating molecules in bulk and rapidly testing them for desirable properties. High-throughput methods are similar to combinatorial chemical methods and involve using a brute-force approach to collect a large amount of experimental data related to molecules being tested. For example, high-throughput methods can be used to optimize chemical reactions by testing matrices of different chemical reactants, catalysts, and conditions.

Both combinatorial and high-throughput methods have been utilized in polymer synthesis and investigation in combination with parallel synthesizers, microwave synthesizers, and ink-jet printers. These combinations have allowed for the identification of fast and efficient optimization of reaction conditions and for the testing of physical properties of the polymers.

One example of the use of combinatorial and high-throughput methods in polymer science is disclosed in an article entitled "Combinatorial and High-Throughput Approaches in Polymer Science" *Meas. Sci. Technol.* 16 (2005) 203-211. This article discloses using automated parallel synthesizers, microwaves synthesizers, and ink-jet printers to vary certain reaction parameters during polymer synthesis. Specifically, living radical polymerization reactions, emulsion polymerizations, and living cationic ring-opening polymerizations are investigated relative to monomers, catalysts, initiators, solvents, reactant ratios, and reaction temperatures.

Additional examples of the use of combinatorial and high-throughput chemistry, and specifically the use of ink-jet printing techniques, are disclosed in two additional scientific articles. A first article, entitled "Inkjet Printing of Polymer Micro-Arrays and Libraries: Instrumentation, Requirements, and Perspectives" *Macromol. Rapid Commun.* 2003, 24, 659-666, discloses the use of ink-jet printing in the field of polymer deposition and parallel synthesis of a large number of different compounds. This article discloses the commercially available instrumentation for ink-jet printing and corresponding requirements and examines the use of ink-jet printing for the formation of multicolor polymer light emitting diodes and polymer electronic devices. This article provides a general overview of the use of ink-jet printing in polymer deposition but does not disclose specific details about the application of these techniques to particular fields of polymer science.

The second article, entitled "Simple Modification of Sheet Resistivity of Conducting Polymeric Anodes Via Combinatorial Ink-Jet Printing Techniques" *Macromol. Rapid. Commun.* 2005, 26, 238-246, discloses a process for fabricating microelectromechanical structures and electronic devices such as organic thin film transistors, organic resistor-capacitor filers, and polymer capacitors. To fabricate these devices, ink-jet printing is used to deposit and pattern active polymer layers onto anodes. More specifically, sheet resistivity of anodes is modified by controlling ink-jet printers using color functionality corresponding to the deposition of different compounds.

Organoborane amine components are known in the art. For example, organoborane amine components used for the bulk polymerization of acrylic monomers are described in U.S. Pat. No. 3,275,611 (Sep. 27, 1966). Certain organoboron compounds such as trialkylboranes by themselves, however, are pyrophoric in the presence of oxygen, so preformed complexes between the organoboron compounds and amine compounds are required to have the benefit of imparting improved stability to organoboron compounds such as the trialkylboranes.

Recent modifications on the structure of organoborane amine components are described in U.S. Pat. No. 6,706,831 (Mar. 16, 2004), which also describes use of the complexes in acrylate based adhesives. The combination of alkylborane-amine complexes with amine reactive decomplexing agents to initiate the polymerization of acrylic adhesives at room temperature is also described in the '831 patent. Such compositions offer the advantage of rapid cure and adhesion to low energy surfaces.

In view of the disclosure and teachings of the related art, there remains an opportunity to provide a method of preparing a substrate including a composition disposed thereon using materials in the composition that, to date, have not been recognized as useable to form patterns on substrates. There also remains an opportunity to develop combinatorial and high-throughput methods of generating and testing such materials.

SUMMARY OF THE INVENTION AND ADVANTAGES

The present invention provides a method of preparing a substrate with a composition disposed thereon. The composition comprises (i) an organoborane initiator and (ii) a radical curable component. The method comprises the step of depositing the composition onto the substrate wherein at least one of (i) the organoborane initiator and (ii) the radical curable component is deposited onto the substrate in the form of a gradient pattern. The present invention also provides an article. The article comprises the substrate and the gradient pattern formed on the substrate. The gradient pattern is formed from a developed composition comprising the reaction product of (i) the organoborane initiator and (ii) the radical curable component.

By forming the gradient pattern on the substrate, combinatorial and high-throughput methods of generating and testing the developed composition are possible, which enable characterization of the developed composition for various physical and chemical properties. For example, optimum physical and/or chemical properties of the developed composition may be quickly and efficiently determined by forming the gradient pattern and characterizing the developed composition at different points in the gradient pattern, whereby the gradient pattern enables precise amounts of (i) the organoborane initiator and (ii) the radical curable component to be correlated to the characterized physical and/or chemical property.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1A:
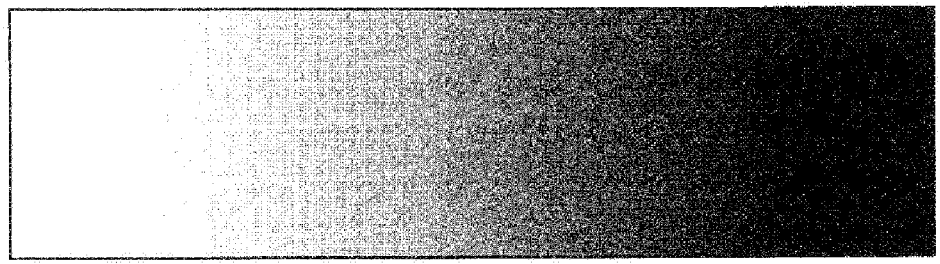
FIG. 1a is an image of a gradient pattern that is 319 pixels wide by 1200 pixels long, that increases progressively from 100 to 0% black, and that is prepared using Adobe Photoshop® Elements software.

A method of preparing a substrate and an article including the substrate and a gradient pattern formed thereon, are provided. The substrate is prepared with a composition including (i) an organoborane initiator and (ii) a radical curable component, among other optional components such as (iii) a decomplexing component. In one embodiment, the composition comprises a mixture of the organoborane initiator and the radical curable component that is separated from the decomplexing agent. In another embodiment, the composition comprises a first mixture including the organoborane initiator and a first amount of the radical curable component and a second mixture including a second amount of the radical curable component and the decomplexing component. It is to be understood that the composition may include any combination of the organoborane initiator, the radical curable component, and the decomplexing component so long as the organoborane initiator and the decomplexing component are not stored together or combined before reaction and cure is desired.

The gradient pattern is formed on the substrate by depositing the composition on the substrate wherein at least one of the organoborane initiator and the radical curable component is deposited on the substrate in the form of the gradient pattern. In an alternative embodiment, the gradient pattern is formed by depositing at least one of the organoborane initiator, the radical curable component, and the decomplexing component on the substrate in the form of the gradient pattern. The composition cures or develops at reduced temperatures and can be utilized in a wide range of curing conditions due to an ability to develop more rapidly in deep and confined areas, thereby reducing production costs and energy expenditure associated with operating curing ovens and/or long curing cycles. The composition, after developing, is also resistant to inhibitors of Pt-group hydrosilylation catalysts and exhibits increased thermal stability. The composition also contributes to formation of a substantially developed surface, thereby decreasing surface wetness. The composition also rapidly cross-links and may bond to various materials at reduced temperatures including, but not limited to, plastics, metals, and other inorganic surfaces. Rapid cross-linking and an ability of the composition to bond to various materials at reduced temperatures increases production efficiency and speed and further reduces production costs and energy expenditure associated with heating.

The method and the article of the present invention are useful for determining optimum physical and/or chemical properties of the developed composition. In particular, the method is useful for testing and analytical purposes to correlate amounts or types of organoborane initiators, decomplexing components, and radical curable components to certain physical and/or chemical properties of the resulting composition after development or curing. This is possible due to the formation of the gradient pattern.

The gradient pattern is more specifically defined as a pattern with a progressive change (increase) in surface coverage of at least one of the organoborane initiator, the radical curable component, and/or the decomplexing component, varying along a linear axis on the surface of the substrate. It is also contemplated that optional components may also be included with the organoborane initiator, the radical curable component, and/or the decomplexing component. More specifically, the pattern exhibits a gradient in composition.

In forming the gradient pattern, the variation in the surface coverage is typically a monotonic variation of from 0 to 100%, or any ranges in-between and one or more of the organoborane initiator, the radical curable component, and/or the decomplexing component may be varied along one linear or curvilinear axis of the surface. It is contemplated that between upper and lower bounds of surface coverage, the coverage of the organoborane initiator, the decomplexing component, and/or the radical curable component may be linear or non-linear and is preferably monotonic and controlled in variation. Further, two or more of the organoborane initiator, the decomplexing component, and/or the radical curable component may be varied along linear axes that are perpendicular to each other, which results in a larger number of combinations between amount and type of component on the substrate as compared to variation of the amount and type of component along a single axis. For example, in one embodiment, the gradient pattern, prior to reaction, is further defined as surface coverage of the organoborane initiator on the substrate varying from 0 to 100% along a first axis and surface coverage of the decomplexing component on the substrate varying from 0 to 100% along a second axis transverse to the first axis. In another embodiment, the gradient pattern is further defined as surface coverage of at least one of the organoborane initiator and the radical curable component on the substrate increasing progressively from 0 to 100% along a first axis. In this embodiment, the gradient pattern may be further defined as surface coverage of the decomplexing component on the substrate increasing progressively from 0 to 100% along a second axis transverse to the first axis. In yet another embodiment, the gradient pattern is further defined as surface coverage of at least one of the organoborane initiator, the radical curable component, and the decomplexing component on the substrate increasing progressively from 0 to 100% along a first axis. In this embodiment, the gradient pattern may be further defined as surface coverage of at least one of the organoborane initiator, the radical curable component, and the decomplexing component on the substrate increasing progressively from 0 to 100% along a second axis transverse to the first axis, so long as the at least one of the organoborane initiator, the radical curable component, and the decomplexing component along the second axis is not the same as the at least one of the organoborane initiator, the radical curable component, and the decomplexing component along the first axis. As just one example, if the organoborane initiator is deposited on the substrate in a gradient pattern increasing progressively from 0 to 100% along a first axis (e.g. the x-axis), there may be surface coverage of the radical curable component and/or the decomplexing component on the substrate increasing progressively from 0 to 100% along a second axis (e.g. the y-axis) transverse to the first axis. Physical and/or chemical properties of the resulting composition, after curing, can be tested and the specific amounts of the organoborane initiator and the decomplexing component, for example, can be correlated to the physical and/or chemical properties that are measured.

Referring back, the organoborane initiator may be any organoborane known in the art capable of generating free radicals. Typically, the organoborane initiator is derived from decomplexation of an air-stable complex of an organoborane and an organonitrogen compound. In one embodiment, the organoborane has the general structure:

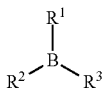

wherein each of R1-R3 independently has from 1 to 20 carbon atoms; and wherein each of R1-R3 is independently selected from the group of a hydrogen, an aliphatic hydrocarbon group, and an aromatic hydrocarbon group. Specific examples of the organoborane represented by the formula above include those selected from the group of tri-methylborane, tri-ethylborane, tri-n-butylborane, tri-n-octylborane, tri-sec-butylborane, tridodecylborane, phenyldiethylborane, and combinations thereof. Typically, the organoborane comprises tri-n-butylborane. More specifically, while the organoborane of the present invention may include a combination of specific organoboranes, one of the organoboranes is typically tri-n-butylborane. In another embodiment, the organoborane is organosilicon functional. More specifically, the organoborane may have a similar structure to the structure set forth above, but at least one of the functional groups pending from the boron atom may include, for example, a silicon atom, a siloxane oligomer, or a siloxane polymer. Such organosilicon functional organoboranes are described in PCT Publication No. WO06073695A1, the portions of which describe organosilicon functional organoboranes are hereby incorporated by reference.

In an alternative embodiment, the organoborane initiator is further defined as an organoborane-organonitrogen complex. Suitable organoborane-organonitrogen complexes include, but are not limited to, organoborane-amine complexes, organoborane-azole complexes, organoborane-amidine complexes, organoborane-heterocyclic nitrogen complexes, amido-organoborate complexes, and combinations thereof. Additional suitable organoborane initiators are described in U.S. Pat. App. Pub. No. 2007/0141267, U.S. Pat. No. 7,247,596, and WO Publication. No. 2007/044735, expressly incorporated herein by reference relative to the organoborane initiators. In one embodiment, the organoborane initiator is further defined as a complex of an organoborane and an amine, i.e., an organoborane-amine complex. The organoborane-amine complex may comprise a trialkylborane-amine complex. A typical organoborane-amine complex includes a complex formed between an organoborane and a suitable amine that renders the organoborane-amine complex stable at ambient conditions. Any organoborane-amine complex known in the art may be used. Typically, the organoborane-amine complex is capable of initiating polymerization or cross-linking of the radical curable component through introduction of an amine-reactive compound, and/or by heating. That is, the organoborane-amine complex may be destabilized at ambient temperatures through exposure to suitable amine-reactive compounds.

The organoborane-amine complex typically has the formula:

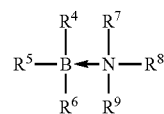

wherein B represents boron. Additionally, each of $R^4$, $R^5$, and $R^6$ is typically independently selected from the group of a hydrogen atom, a cycloalkyl group, a linear or branched alkyl group having from 1 to 12 carbon atoms in a backbone, an alkylaryl group, an organosilane group, an organosiloxane group, an alkylene group capable of functioning as a covalent bridge to the boron, a divalent organosiloxane group capable of functioning as a covalent bridge to the boron, and halogen substituted homologues thereof, such that at least one of $R^4$, $R^5$, and $R^6$ includes one or more silicon atoms, and is covalently bonded to boron. Further, each of $R^7$, $R^8$, and $R^9$ typically yields an amine compound or a polyamine compound capable of complexing the boron. Two or more of $R^4$, $R^5$, and $R^6$ and two or more of $R^7$, $R^8$, and $R^9$ typically combine to form heterocyclic structures, provided a sum of the number of atoms from $R^4$, $R^5$, $R^6$, $R^7$, $R^8$, and $R^9$ does not exceed 11.

Some examples of amines that are suitable for complexing with the organoborane in the organoborane-amine complex include organic amine compounds such as 1,3 propane diamine, 1,6-hexanediamine, methoxypropylamine, pyridine, and isophorone diamine. Alternatively, the amine may include a group selected from an alkyl group, an alkoxy group, an imidazole group, an amidine group, an ureido group, and combinations thereof. Other examples of suitable amine are described in U.S. Pat. Nos. 6,777,512 and 6,806,330, which are expressly incorporated by reference herein relative to the amines. Yet other examples of suitable amines include silicon containing amines selected from the group of amine-functional silanes, amine-functional organopolysiloxanes, and combinations thereof. Specific examples of amine-functional silanes that are suitable for purposes of the present invention include aminosilanes such as 3-aminomethyltrimethoxysilane, 3-aminopropyltrimethoxysilane, 3-aminomethyltriethoxysilane, 3-aminopropyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, N-(2-aminoethyl)-3-aminomethyltrimethoxysilane, N-(2-aminoethyl)-3-aminopropyltrimethoxysilane, N-(6-aminohexyl)aminomethyltrimethoxysilane, N-(2-aminoethyl)-11-aminoundecyltrimethoxysilane, (aminoethylaminomethyl)phenethyltrimethoxysilane, N-(2-aminoethyl)-3-aminopropylmethyldimethoxysilane, N-(2-aminoethyl)-3-aminoisobutylmethyldimethoxysilane, and (3-trimethoxysilylpropyl)diethylene-triamine.

Amine-functional organopolysiloxanes that are suitable for purposes of the present invention include organosilicon compounds described below in formulas (a) and (b), and those compounds described herein as organopolysiloxane resins, subject to the stipulation that the organopolysiloxanes contain at least one amine functional group such as 3-aminopropyl, aminomethyl, 2-aminoethyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole.

Specific examples of organopolysiloxanes that are suitable for purposes of the present invention include terminal and/or pendant amine-functional polydimethylsiloxane oligomers and polymers, terminal and/or pendant amine-functional random, graft and block copolymers and co-oligomers of polydimethylsiloxane and poly(3,3,3 trifluoropropyl-methylsiloxane), terminal and/or pendant amine-functional random, graft and block copolymers and co-oligomers of polydimethylsiloxane and poly(6,6,6,5,5,4,4,3,3-nonfluorohexyl-methylsiloxane), and terminal and/or pendant amine-functional random, graft and block copolymers and co-oligomers of polydimethylsiloxane and polyphenymethylsiloxane. Other examples of useful compounds include resinous amine-functional siloxanes such as the amine-functional compounds described herein as organopolysiloxane resins, as well as amine-functional polysilsesquioxanes.

Other nitrogen containing compounds may also be complexed with the organoborane, such as compounds selected from the group of N-(3-triethyoxysilylpropyl)-4,5-dihydroimidazole, ureidopropyltriethoxysilane, siloxanes of formulas similar to formulas (a) and (b) so long as they include at least one nitrogen atom, and those compounds described herein as organopolysiloxane resins in which at least one group is an imidazole, amidine, or ureido functional group. When the amine or organonitrogen compound is polymeric, the molecular weight is not limited, except that it should be such as to maintain a sufficiently high concentration of boron to permit polymerization of the composition.

The organoborane initiator may be physically and/or chemically attached (bound) to a solid particle such as a phase support to control working times, as well as to stabilize liquid phase organoborane-amine complexes against separating during storage. Attachment can be accomplished by a number of known surface treatments either in-situ or a priori. Some surface treatment methods include pre-treating solid particles such as ground or precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof, base metals such as nickel, aluminum, copper, and steel, and combinations thereof, with a condensation reactive compound. Some examples of condensation reactive compounds that may be used include, but are not limited to, aminopropyltrimethoxysilane, isocyanatopropyltriethoxysilane, isocyanatomethyltriethoxysilane, triethoxysilylundecanal, glycidoxypropyltrimethoxysilane, glycidoxymethyltrimethoxysilane, 3-(triethoxysilyl)propyl-succinic anhydride, 2-(4-chlorosulfonylphenyl)ethyltrimethoxysilane, and combinations thereof. Although it is typically desirable to control the particle size and particle size distribution to impart the desired properties, the size of the particles is not inherently limited, and can range from discrete nanoparticles, i.e., nanometer diameter, to agglomerated or fused structures up to millimeter size. The pretreatment may be followed by complexation with the organoborane, or by direct treatment of the solid particles using a preformed organoborane initiator that is condensation reactive. If the solid particles include surface functional groups, additives such as surface treating agents or impurities that are inherently amine-reactive, may require appropriate pre-cautions to avoid premature decomplexation of the organoborane initiator being attached. Solid particles including amine-reactive substances can be purified or neutralized before attachment of the organoborane initiator. Alternatively, the attachment of the organoborane initiator may be performed in an oxygen free environment.

While about 100% by weight of the organoborane initiator is typically the organoborane-organonitrogen complex or the organoborane-amine complex, it is to be appreciated that other compounds, such as impurities and other compounds known in the art to be commonly present with the organoborane initiator, may also be present such that less than 100% by weight of the organoborane initiator is the organoborane-organonitrogen complex or the organoborane-amine complex. The organoborane initiator is typically present in the composition in an amount sufficient to provide a concentration of boron of from 100 and 10,000 parts by weight, more typically from 300 to 3,000 parts by weight, per one million weight parts of the radical curable component present in the composition.

It is to be understood that an overall concentration of the organoborane initiator may be deliberately varied across the gradient pattern by changing surface coverage of the organoborane initiator that is deposited on the substrate in a systematic manner along one axis of the surface. Hence, the overall concentration range of the organoborane initiator on the substrate, based upon the combined weight of all components, can range from zero to 100%.

Referring back, the decomplexing component may include an organonitrogen reactive compound (e.g. an amine reactive compound) that is capable of reacting with the organonitrogen (e.g. the amine) in the organoborane initiator. The decomplexing component may be a small molecule, a monomer, an oligomer, a polymer, or a mixture thereof, and may also be diluted or borne by a carrier such as an aqueous or non-aqueous solvent, or by a filler particle. In one embodiment, wherein the organoborane initiator is further defined as an organoborane-organonitrogen complex, the decomplexing component allows pattern development to occur rapidly at temperatures below the dissociation temperature of the organoborane-organonitrogen complex, including room temperature and below. The decomplexing component may be deposited onto the substrate as a liquid, gas, or solid.

Examples of suitable amine reactive- and organonitrogen reactive-compounds that may be included in the decomplexing component include those selected from the group of mineral acids, Lewis acids, carboxylic acids, carboxylic acid derivatives such as anhydrides and succinates, carboxylic acid salts, isocyanates, aldehydes, epoxides, acid chlorides, sulphonyl chlorides, iodonium salts, anhydrides, and combinations thereof. Some specific examples include compounds selected from the group of acrylic acid, methacrylic acid, polyacrylic acid, polymethacrylic acid, methacrylic anhydride, 2-carboxyethyl acrylate, 2-carboxyethyl methacrylate, undecylenic acid, acetic acid, oleic acid, lauric acid, lauric anhydride, citraconic anhydride, ascorbic acid (Vitamin C), isophorone diisocyanate monomers or oligomers, methacryloylisocyanate, 2-(methacryloyloxy)ethyl acetoacetate, undecylenic aldehyde, dodecyl succinic anhydride, and combinations thereof.

Further examples include compounds selected from the group of silanes, organosiloxanes, and combinations thereof. Some examples of suitable organosilanes include those selected from the group of 3-isocyanatopropyltrimethoxysilane, 3-isocyanatomethyltrimethoxysilane, 3-glycidoxypropyltrimethoxysilane, and combinations thereof. Other organosilicon compounds that can be used include those selected from the group of triethoxysilylpropyl succinic anhydride; propylsuccinic anhydride functionalized linear, branched, resinous, and hyperbranched organopolysiloxanes; methylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes; and combinations thereof.

U.S. Pat. No. 6,777,512 describes silicon containing compounds that can be used in the decomplexing component including certain compounds that release an acid when exposed to moisture. The '512 patent also describes amine reactive compounds referred to as decomplexation agents that can be used in the decomplexing component. U.S. Pat. No. 6,777,512 is hereby expressly incorporated by reference relative to the silicon containing compound and the decomplexation agents described above.

Although a notable advantage of the method of the present invention is rapid ambient temperature development of patterns without the need for a radiation source, the composition may be used to create patterns using existing radiative processes such as under a UV or e-beam source to accelerate reaction, enable curing in shadowed regions or in deep sections, or to impart improved adhesion to the substrate. In such cases, it may be useful to include compounds in the decomplexing component that are capable of generating organonitrogen- or amine-reactive groups when exposed to ultraviolet radiation, such as a photoacid generator. Examples of such compounds include iodonium salts containing $[SbF_6]^-$ counter ions. In such an embodiment, it may be useful to optionally include a photosensitizing compound such as isopropylthioxanthone.

While about 100% by weight of the decomplexing component is typically the organonitrogen- or amine-reactive compound, it is to be appreciated that other compounds, such as impurities and other compounds known in the art to be commonly present with the organonitrogen- or amine-reactive compound, may also be present such that less than 100% by weight of the decomplexing component is the organonitrogen- or amine-reactive compound.

The relationship between the organoborane initiator and the decomplexing component enables development, virtually instantaneously, of a range of radical curable components such as unsaturated monomers. The radical curable component can include an organic compound, such as an acrylic compound, or an organometallic compound, such as a radical curable organosilicon compound. In either case, the radical curable component can include a single monomer, oligomer, or polymer containing unsaturation and capable of undergoing free radical polymerization. Mixtures of monomers, oligomers, and polymers can also be used. In one embodiment, the radical curable component includes a first radical polymerizable (curable) monomer and a second radical polymerizable (curable) monomer which may be combined or may be separated. The mixtures may be used to impart a desired combination of physical properties such as viscosity, volatility, substrate wetting for processability and resolution in an uncured state, glass transition temperature, hardness or solubility, and surface properties such as hydrophilicity or hydrophobicity in the cured state. When the radical curable component includes an organic compound, the selected compound will depend on the use of the cured product. Examples of suitable organic compounds are described in U.S. Pat. No. 6,762,260, including organic compounds such as 2-ethylhexylacrylate, 2-ethylhexylmethacrylate, methylacrylate, methylmethacrylate, neopentyl glycol diacrylate, neopentyl glycol dimethacrylate, glycidyl acrylate, glycidyl methacrylate, allyl acrylate, allyl methacrylate, stearyl acrylate, stearyl methacrylate, tetrahydrofurfuryl methacrylate, caprolactone acrylate, perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, tetrahydroperfluoro acrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethylene glycol diacrylate, diethylene glycol dimethacrylate, dipropylene glycol diacrylate, dipropylene glycol dimethacrylate, polyethylene glycol diacrylate, polyethylene glycol dimethacrylate, polypropylene glycol diacrylate, polypropylene glycol dimethacrylate, trimethylolpropane triacrylate, trimethylolpropane trimethacrylate, ethoxylated trimethylolpropane triacrylate, ethoxylated trimethylolpropane trimethacrylate), pentaerythritol triacrylate, pentaerythritol trimethacrylate), pentaerythritol tetraacrylate, pentaerythritol tetramethacrylate, methyl-3-butenoate, allyl methyl carbonate, diallyl pyrocarbonate, allyl acetoacetate, diallyl carbonate, diallyl phthalate, dimethyl itaconate, diallyl carbonate, and combinations thereof. Other suitable organic compounds include acrylate tipped polyurethane prepolymers prepared by reacting isocyanate reactive acrylate monomers, oligomers or polymers such as hydroxy acrylates with isocyanate functional prepolymers. U.S. Pat. No. 6,762,260 is expressly incorporated herein by reference relative to the organic compounds.

Also suitable for use in the radical curable component are a class of conductive monomers, dopants, oligomers, polymers, and macromonomers having an average of at least one free radical polymerizable group per molecule, and the ability to transport electrons, ions, holes, and/or phonons. For example, U.S. Pat. No. 5,929,194 describes the preparation of various free radical polymerizable hole transporting compounds such as 4,4'4"-tris[N-(3(2-acryloyoxyethyloxy)phenyl)-N-phenylamino]triphenylamine and 4,4'4"-tris[N-(3 (benzoyloxyphenyl)-N-phenylamino]triphenylamine, and preparation of electroluminescent devices made therefrom. U.S. Pat. No. 5,929,194 is also expressly incorporated herein by reference relative to the free radical polymerizable hole transporting compounds introduced above. It is noted that the acrylic functional group prefixes acryloyl- and acryl-are used interchangeably herein, as are the methacrylic functional group prefixes methacryloyl- and methacryl-.

When an organosilicon compound is used in the radical curable component, again the selected compound depends on the use of the cured product. Generally, the organosilicon compound comprises organosilanes or organopolysiloxanes having on average at least one free radical polymerizable moiety. The organosilicon compound can be monomeric, oligomeric, polymeric, or it can be a mixture of monomers, and/or oligomers, and/or polymers. Higher molecular weight species of such free radical polymerizable compounds are often referred to in the art as macromonomers. The organosilicon compounds can contain mono-functional or multifunctional units in the free radical polymerizable group. This allows for polymerization of the organosilicon compounds to linear polymers, branched polymers of various architecture, copolymers of various architecture, or crosslinked polymeric networks. The monomers and oligomers can be any monomer or oligomer normally used to prepare addition or condensation curable polymers, or they can be monomers or oligomers used in other types of curing reactions, provided they contain at least one free radical polymerizable group.

Suitable organosilicon monomers include compounds having a structure generally corresponding to the formula $R''_n Si(OR''')_{4-n}$, where n is 0-4; and where at least one of the R'' or R''' groups contains a free radical polymerizable group. The R'' and R''' groups can be independently, hydrogen; a halogen atom; or an organic group including alkyl groups, haloalkyl groups, aryl groups, haloaryl groups, alkenyl groups, alkynyl groups, acrylate functional groups, and methacrylate functional groups. The R'' and R''' groups may also contain other organic functional groups including glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, and hydroxyl groups.

Representative examples of free radical polymerizable organosilicon monomers include compounds such as 3-methacryloxypropyltrimethoxysilane, 3-methacryloxymethyltrimethoxysilane, 3-methacryloxypropyltriethoxysilane, 3-acryloxypropyltrimethoxysilane, 3-acryloxymethyltrimethoxysilane, 3-methacryloxypropyltrimethylsilane, 3-acryloxypropyltriethoxysilane, 3-acryloxylpropyltrimethylsilane, vinyltrimethoxysilane, allyltrimethoxysilane, 1-hexenyltrimethoxysilane, tetra-(allyloxysilane), tetra-(3-butenyl-1-oxy)silane, tri-(3-butenyl-1-oxy)methylsilane, di-(3-butenyl-1-oxy)dimethylsilane, and 3-butenyl-1-oxy trimethylsilane. Other examples include di-alkoxy functional analogs of the trialkoxysilanes exemplified above, such as 3-methacryloxypropylmethyldimethoxysilane, monoalkoxy functional analogs of the above, such as 3-methacryloxypropyldimethylmethoxysilane. Also included within this class are halosilane precursors of these monomers, such as 3-methacryloxypropyltrichlorosilane, 3-methacryloxypropylmethyldichlorosilane, and 3-methacryloxypropyldimethylchlorosilane. The preferred radical polymerizable moieties for these organosilicon compounds are aliphatic unsaturated groups in which the double bond is located at the terminal positions, internal positions, or both positions relative to the functional group. The most preferred radical polymerizable moieties for the organosilicon compounds are acrylate groups or methacrylate groups.

When the radical curable component includes an organosilicon monomer, oligomer, or polymer, the radical curable component can be an organopolysiloxane having a linear, branched, hyperbranched, or resinous structure. The radical curable component can be homopolymeric or copolymeric. The radical polymerizable moiety for the organopolysiloxane can be an unsaturated organic group such as an alkenyl group having 2-12 carbon atoms, exemplified by the vinyl group, allyl group, butenyl group, or the hexenyl group. The unsaturated organic group can also comprise alkynyl groups having 2-12 carbon atoms, exemplified by the ethynyl group, propynyl group, or the butynyl group. The unsaturated organic group can bear the radical polymerizable group on an oligomeric or polymeric polyether moiety such as an allyloxypoly(oxyalkylene) group or a halogen substituted analog thereof. The radical polymerizable organic group can contain acrylate functional groups or methacrylate functional groups, exemplified by acryloxyalkyl groups such as acryloxymethyl and acryloxypropyl groups, and methacryloxyalkyl groups such as methacryloxymethyl and methacryloxypropyl groups. The unsaturated organic groups can be located at the terminal positions, pendant positions, or both the terminal and pendant positions relative to the polymer backbone. The preferred radical polymerizable moiety for monomeric, oligomeric, and polymeric organosilicon compounds are acrylate groups and methacrylate groups.

Any remaining silicon bonded organic groups can be monovalent organic groups free of aliphatic unsaturation. The monovalent organic group can have 1-20 carbon atoms, preferably 1-10 carbon atoms, and is exemplified by alkyl groups such as methyl, ethyl, propyl, pentyl, octyl, undecyl, and octadecyl; cycloalkyl groups such as cyclohexyl; aryl groups such as phenyl, tolyl, xylyl, benzyl, and 2-phenylethyl; alkyloxypoly(oxyalkylene) groups such as propyloxypoly(oxyethylene), propyloxypoly(oxypropylene), propyloxy-poly(oxypropylene) -co-poly(oxyethylene) groups, halogen substituted analogs thereof; cyano functional groups including cyanoalkyl groups such as cyanoethyl and cyanopropyl; carbazole groups such as 3-(N-carbazolyl)propyl; arylaminofunctional groups such as 4-(N,N-diphenylamino)phenyl-3-propyl; and halogenated hydrocarbon groups such as 3,3,3-trifluoropropyl, 3-chloropropyl, dichlorophenyl, and 6,6,6,5,5,4,4,3,3-nonafluorohexyl.

The radical curable component that includes the organosilicon compound can vary in consistency from a fluid having a viscosity of 0.001 Pa·s at 25° C. to a gum. The radical curable component that is the organosilicon compound can also be a solid that becomes flowable at an elevated temperature or by the application of shear.

The radical curable component may include organopolysiloxane fluids having the formulae:

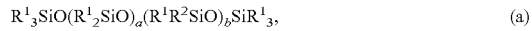

$R^1_3SiO(R^1_2SiO)_a(R^1R^2SiO)_bSiR^1_3$, (a)

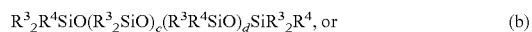

$R^3_2R^4SiO(R^3_2SiO)_c(R^3R^4SiO)_dSiR^3_2R^4$, or (b)

combinations of such fluids. (c)

In Formula (a), a has an average value of zero to 20,000, b has an average value of from 1-20,000, c has an average value of zero to 20,000, and d has an average value of zero to 20,000. Each $R^1$ group is independently a monovalent organic group. The $R^2$ group is independently an unsaturated monovalent organic group. The $R^3$ groups can be the same as the $R^1$ groups. Each $R^4$ group is independently an unsaturated organic group.

Suitable $R^1$ groups are monovalent organic groups including acrylic functional groups such as acryloxymethyl, acryloxypropyl, methacryloxymethyl, methacryloxypropyl groups; alkyl groups such as methyl, ethyl, propyl, and butyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanomethyl, cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; alkyloxypoly(oxyalkyene) groups such as propyloxy(polyoxyethylene), propyloxypoly(oxypropylene), and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as acetoxymethyl and benzoyloxypropyl groups; hydroxy functional groups such as hydroxy and 2-hydroxyethyl groups; isocyanate and masked isocyanate functional groups such as 3-isocyanatopropyl, tris-3-propyl-isocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carboxylic acid functional groups such as 3-carboxypropyl and 2-carboxyethyl groups; carbazole groups such as 3-(N-carbazolyl)propyl; arylamino-functional groups such as 4-(N,N-diphenylamino)phenyl-3-propyl; and metal salts of carboxylic acids such as the zinc, sodium, or potassium salts of 3-carboxypropyl and 2-carboxyethyl.

The $R^2$ group is exemplified by alkenyl groups such as vinyl, allyl, and butenyl groups; alkynyl groups such as ethynyl and propynyl groups; and acrylic functional groups such as acryloxypropyl and methacryloxypropyl groups. As noted, the $R^3$ groups can be the same as the $R^1$ groups. The $R^4$ group is exemplified by alkenyl groups such as vinyl, allyl, and butenyl groups; alkynyl groups such as ethynyl and propynyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; and acrylic functional groups such as acryloxymethyl, acryloxypropyl, methacryloxymethyl, and methacryloxypropyl groups.

Some representative organopolysiloxane fluids suitable for use in the radical curable component include α,ω-methacryloxypropyl-dimethylsilyl terminated polydimethylsiloxanes; α,ω-methacryloxymethyl-dimethylsilyl terminated polydimethylsiloxanes; α,ω-acryloxypropyl-dimethylsilyl terminated polydimethylsiloxanes; α,ω-acryloxymethyl-dimethylsilyl terminated polydimethylsiloxanes; pendant acrylate functional polymers and methacrylate functional polymers such as poly(acryloxypropyl-methylsiloxy)-polydimethylsiloxane copolymers and poly(methacryloxypropyl-methylsiloxy)-polydimethylsiloxane copolymers; and telechelic polydimethylsiloxanes having multiple acrylate functional groups or methacrylate functional groups such as compositions formed via Michael addition of multi-acrylate monomers or multi-methacrylate monomers to amine terminated polydimethylsiloxanes. Such functionalizing reactions can be carried out a priori or in-situ.

For the radical curable component, it may be desirable to use a mixture of organopolysiloxane fluids differing in their degree of functionality and/or the nature of the free radical polymerizable group. For example, a much faster crosslinking efficiency and a reduced sol content can be obtained by using a tetra-functional telechelic polydimethylsiloxane prepared by the Michael addition reaction of N-(methyl)isobutyl-dimethylsilyl terminated polydimethylsiloxane with two molar equivalents of trimethylolpropane tri-acrylate as the radical curable component, relative to di-functional methacryloxypropyl-dimethylsilyl terminated polydimethylsiloxanes having a similar degree of polymerization (DP). However, the latter compositions also produce lower modulus elastomeric patterns. Hence, combinations of organopolysiloxane fluids having differing structures may be quite useful. Methods for preparing such organopolysiloxane fluids are known and include the hydrolysis and condensation of the corresponding organohalosilanes or the equilibration of cyclic polydiorganosiloxanes.

The radical curable component can include an organosiloxane resin including MQ resins containing $R^5_3SiO_{1/2}$ units and $SiO_{4/2}$ units; TD resins containing $R^5SiO_{3/2}$ units and $R^5_2SiO_{2/2}$ units; MT resins containing $R^5_3SiO_{1/2}$ units and $R^5SiO_{3/2}$ units; MTD resins containing $R^5_3SiO_{1/2}$ units, $R^5SiO_{3/2}$ units, and $R^5_2SiO_{2/2}$ units; or combinations thereof. Each $R^5$ group in these organosiloxane resins represents a monovalent organic group. The monovalent organic group $R^5$ can have 1-20 carbon atoms, preferably 1-10 carbon atoms.

Some examples of suitable monovalent organic groups representative of the $R^5$ group include acrylate functional groups such as acryloxyalkyl groups; methacrylate functional groups such as methacryloxyalkyl groups; cyano functional groups; and monovalent hydrocarbon groups. Monovalent hydrocarbon groups include alkyl groups such as methyl, ethyl, propyl, pentyl, octyl, undecyl, and octadecyl groups; cycloalkyl groups such as cyclohexyl groups; alkenyl groups such as vinyl, allyl, butenyl, and hexenyl groups; alkynyl groups such as ethynyl, propynyl, and butynyl groups; aryl groups such as phenyl, tolyl, xylyl, benzyl, and 2-phenylethyl groups; halogenated hydrocarbon groups such as 3,3,3-trifluoropropyl, 3-chloropropyl, dichlorophenyl, and 6,6,6,5,5,4,4,3,3-nonafluorohexyl groups; and cyano-functional groups including cyanoalkyl groups such as cyanoethyl and cyanopropyl groups.

The $R^5$ group can also comprise an alkyloxypoly(oxyalkyene) group such as propyloxy(polyoxyethylene), propyloxypoly(oxypropylene) and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene) and perfluoropropyloxy-poly(oxypropylene)-co-poly(oxyethylene) groups; alkenyloxypoly(oxyalkyene) groups such as allyloxypoly(oxyethylene), allyloxypoly(oxypropylene) and allyloxy-poly(oxypropylene)-co-poly(oxyethylene) groups; alkoxy groups such as methoxy, ethoxy, n-propoxy, isopropoxy, n-butoxy and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; hindered aminoalkyl groups such as tetramethylpiperidinyl oxypropyl groups; epoxyalkyl groups such as 3-glycidoxypropyl, 2-(3,4,-epoxycyclohexyl)ethyl, and 5,6-epoxyhexyl groups; ester functional groups such as acetoxymethyl and benzoyloxypropyl groups; hydroxy functional groups such as hydroxy and 2-hydroxyethyl groups; isocyanate and masked isocyanate functional groups such as 3-isocyanatopropyl, tris-3-propyl-isocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carboxylic acid functional groups such as 3-carboxypropyl, 2-carboxyethyl, and 10-carboxydecyl groups; carbazole groups such as 3-(N-carbazolyl)propyl; arylamino-functional groups such as 4-(N,N-diphenylamino) phenyl-3-propyl; and metal salts of carboxylic acids such as zinc, sodium, and potassium salts of 3-carboxypropyl and 2-carboxyethyl.

The organosiloxane resin can contain an average of 1-40 mole percent of radical polymerizable groups such as unsaturated organic groups. The unsaturated organic groups may be alkenyl groups, alkynyl groups, acrylate-functional groups, methacrylate-functional groups, or a combination of such groups. The mole percent of unsaturated organic groups in the organosiloxane resin is considered herein to be the ratio of (i) the number of moles of unsaturated groups containing siloxane units in the resin, to (ii) the total number of moles of siloxane units in the resin, times a factor of 100. Some specific examples of suitable organosiloxane resins that are useful as the radical curable component are $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}T^{Methacryloxypropyl}$ resins, $TT^{Phenyl}T^{Methacryloxymethyl}$ resins, and $TT^{Phenyl}T^{Methacryloxypropyl}$ resins, where M, D, T, and Q have the same meanings as defined above.

Methods of preparing such organosiloxane resins are known including resins made by treating a resin copolymer produced by a silica hydrosol capping process, with an alkenyl containing endblocking reagent, as described in U.S. Pat. No. 2,676,182, which is expressly incorporated herein by reference relative to the aforementioned methods of producing organosiloxane resins. This method involves reacting a silica hydrosol under acidic conditions with a hydrolyzable triorganosilane such as trimethylchlorosilane, a siloxane such as hexamethyldisiloxane, or a mixture thereof, followed by recovery of a copolymer having M and Q units. The copolymer typically contains about 2-5 percent by weight of hydroxyl groups. Organosiloxane resins containing less than about 2 percent by weight of silicon bonded hydroxyl groups may then be prepared by reacting the copolymer with an endblocking agent containing unsaturated organic groups, and with an endblocking agent free of aliphatic unsaturation, in an amount sufficient to provide about 3 to about 30 mole percent of unsaturated organic groups in the product. Some suitable endblocking agents include silazanes, siloxanes, and silanes; and preferred endblocking agents are described in U.S. Pat. Nos. 4,584,355, 4,585,836, and 4,591,622, which are each expressly incorporated herein by reference relative to the aforementioned endblocking agents. A single endblocking agent or a mixture of endblocking agents may be used to prepare such organosiloxane resins.

Another type of organosilicon compound that can be used in the radical curable component is a composition formed by copolymerizing an organic compound, having a polymeric backbone, with an organopolysiloxane, where an average of at least one free radical polymerizable group is incorporated per molecule. Some suitable organic compounds include hydrocarbon based polymers such as polyisobutylene, polybutadienes, and polyisoprenes; polyolefins such as polyethylene, polypropylene and polyethylene polypropylene copolymers; polystyrenes; styrene butadiene; and acrylonitrile butadiene styrene; polyacrylates; polyethers such as polyethylene oxide or polypropylene oxide; polyesters such as polyethylene terephthalate or polybutylene terephthalate; polyamides; polycarbonates; polyimides; polyureas; polymethacrylates; polythiophenes; polypyrroles; polyanilines; polyacetylene; polyphenylene vinylene; polyvinylpyridenes; and partially fluorinated or perfluorinated polymers such as polytetrafluoroethylene; fluorinated rubbers; terminally unsaturated hydrocarbons; olefins; and polyolefins. The organic compound can be a copolymer of any of these polymers, including polymers containing multiple organic functionality, multiple organopolysiloxane functionality, or combinations of organopolysiloxanes and organic compounds. The copolymeric structures can vary in the arrangement of repeating units from random, grafted, to being blocky in nature.

The radical curable component, in addition to bearing on average at least one radical polymerizable group, may have a physical transition temperature, bear an organo functional group with a physical transition temperature, or upon polymerization or crosslinking may form particles that have a physical transition temperature, i.e., glass transition or melting transition, such that the composition undergoes changes marked by a softening or non-linear reduction in its viscosity on reaching certain temperatures under the conditions of use. Such materials are particularly useful for encapsulation of actives that are released by the introduction of heat. For example, an organopolysiloxane-based version of the radical curable component may be an organo functional silicone wax. The wax can be an uncrosslinked organo functional silicone wax, a crosslinked organo functional silicone wax, or a combination of waxes. Such silicone waxes are commercially available and are described in U.S. Pat. No. 6,620,515, which is expressly incorporated herein by reference relative to the silicone waxes. When the organo functional silicone wax bears at least one free radical polymerizable group such as an acrylate or methacrylate group, the wax is useful to impart phase changes when used as the radical curable component. The radical curable component can also comprise a mixture of any of the organic compounds, organosilicon compounds, and/or organopolysiloxane compounds described above.

Some representative and preferred examples of the radical curable component include acrylic and methacrylic organic monomers, multifunctional monomers and macromonomers. Also, (meth)acrylic functional siloxane linear polymers, resins, and copolymers may also be included as the radical curable component, and are particularly useful for tuning properties such as surface energy, modulus, thermal stability, moisture resistance, and hydrophobic balance.

While the specific radical curable compounds set forth above typically make up about 100% by weight of the radical curable component, it is to be appreciated that other compounds, such as impurities and other compounds known in the art to be commonly present with the radical curable compounds may also be present in the radical curable component such that less than 100% by weight of the radical curable component is the radical curable compounds.

In some cases, the radical curable component may also function as the decomplexing component. For example, both acrylic acid and methacrylic acid are capable of reacting with an amine in the organoborane-amine complex, and both are also radical curable. Thus, the method, article, and composition of this invention may include the radical curable component serving as both a radical curable component and as the decomplexing component simultaneously.

Development of the radical curable component may occur upon exposure of the composition including the organoborane initiator, the radical curable component, and optionally the decomplexing component, to (iv) a developing medium. The developing medium can be a liquid, a gas, a solid, or a mixture thereof. The developing medium is typically a medium that includes oxygen. Oxygen may be present in any diluted, dissolved, or pure form, and may be implicitly present in the form of atmospheric air, or explicitly introduced to the composition on the substrate or into the processing environment surrounding the composition on the substrate. Although it is not typically necessary, it may be desirable in some cases to increase, reduce, or eliminate naturally occurring oxygen content in either the composition, in the developing medium, or in the individual organoborane initiator, decomplexing component, and/or radical curable component, by controlling pressure and/or quality of the atmosphere in which the components are stored and in which the method of the invention is carried out. Explicit control of the oxygen content may be carried out by any number of known methods, including controlling the pressures of various types of gases including oxygen, compressed air, oxygen-enriched air, argon, nitrogen, helium and, and/or the inclusion of an oxygen scavenging, oxygen storing, oxygen generating, and/or oxygen releasing substance. Oxygen, for purposes herein, includes all isotopes of oxygen. Oxygen may be introduced as a gas, a liquid, or a solid, but preferably is introduced in the gas phase. Most preferably, the source of oxygen is air.

One or more optional components can be included in the composition. Such optional components may be selected from the group of coloring components such as dyes and pigments; surfactants; water; wetting agents; solvents including common organic aqueous solvents, ionic liquids, and supercritical fluids; diluents; plasticizers; polymers; oligomers; rheology modifiers; adhesion promoters; crosslinking agents; combinations of polymers, crosslinking agents, and catalysts useful for providing a secondary cure of the pattern; polymers capable of extending, softening, reinforcing, toughening, modifying viscosity, or reducing volatility when mixed into the composition; extending and reinforcing fillers; conductive fillers, spacers; dopants; quantum dots such as nanoparticles of cadmium selenide; co-monomers such as organic acrylates and organic methacrylates; UV stabilizers; aziridine stabilizers; void reducing agents; cure modifiers such as hydroquinone and hindered amines; free radical initiators such as organic peroxides and ozonides; acid acceptors; antioxidants; oxygen scavengers; oxygen sponges; oxygen releasing agents; oxygen generators; heat stabilizers; flame retardants; silylating agents; foam stabilizers; fluxing agents; desiccants; and combinations thereof. The optional components may be introduced into the composition through any of the other components that form the composition, such as through the organoborane initiator, the radical curable component, and/or the decomplexing component, the optional developing medium, or through inclusion in a combination of the aforementioned components.

In some cases, it may be desirable to attach the decomplexing component to solid particles which may be any of the solid particles described above. Alternatively, the solid particles may have properties such as electrical conductivity or thermal conductivity, or ferroelectric properties, that can render the resulting pattern more useful for subsequent applications. Attachment of the decomplexing agent, e.g. organonitrogen reactive compounds, can be accomplished by a number of known surface treatments either in-situ or a priori.

Some surface treatment methods include, for example, pre-treating solid particles such as ground or precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof; or a base metal such as nickel, aluminum, copper, and steel; with a condensation reactive compound. This is followed by reaction of the pre-treated solid particles with a compound having organonitrogen or amine reactive groups, or by the direct treatment of the pre-treated solid particles using organonitrogen or amine reactive compounds that have hydrolyzable moieties.

Some examples of condensation reactive compounds that can be used for attachment include isocyanatomethyltriethoxysilane, isocyanatopropyltriethoxysilane, isocyanatomethyltrimethoxysilane, isocyanatopropyltrimethoxysilane, triethoxysilylundecanal, glycidoxymethyltrimethoxysilane, glycidoxypropyltrimethoxysilane, 3-(triethoxysilyl)methylsuccinic anhydride, 3-(triethoxysilyl)propylsuccinic anhydride, and 2-(4-chlorosulfonylphenyl)ethyltrimethoxysilane. Attachment of the decomplexing component to the solid particles can also be accomplished by mixing an acid functional compound with fillers having the appropriate surface functionality, under conditions conducive to formation of an acid base complex, a hydrogen bonded complex, or an acid salt.

Some particulate fillers are commercially available that are pre-treated with surface treating agents referred to as lubricants, or that can be obtained with impurities that contain amine reactive groups, such as carboxylic acid. In this way, the decomplexing component may include the organonitrogen or amine reactive compound and an optional component that can be delivered together in the form of a treated filler. The advantage obtained in this instance is that a reaction between an organoborane-amine complex, as the organoborane initiator, and the amine reactive groups in the filler can help remove the lubricant from the surface of the filler particles. The lubricant may be necessary for stability of the particle in concentrated form, but it can interfere with the intended function of the filler. The reaction of an organoborane-amine complex, as the organoborane initiator, and the amine-reactive lubricant can effectively remove the lubricant from the particle surface, thereby activating the particle. A typical example is a fatty-acid treated silver filler particle, wherein the fatty acid lubricant interferes with particle-to-particle contact, which may be needed for establishing electrical conductivity in a final form.

It may also be advantageous, for the sake of stability, to use a combination of fillers containing organonitrogen or amine reactive groups and fillers that are inert with respect to organonitrogen compounds and/or amines. For example, when the organoborane initiator and the decomplexing component are maintained in separate solutions, the filler that is inert with respect to organonitrogen compounds and/or amines can be combined with the organoborane initiator, while the filler bearing organonitrogen or amine reactive groups can be packaged in a separate container from the organoborane initiator. In that case, the radical curable component can be included with any part of the formulation, or with more than one part. Alternatively, the decomplexing component can be introduced under conditions that allow it to be delivered in the gas phase to a reaction vessel containing the remainder of the composition.

As first introduced above, some representative and preferred examples of organonitrogen or amine reactive groups include carboxylic acid, anhydride, isocyanate, aldehydes, and epoxies. Blocked isocyanates may be useful in cases where instead of ambient polymerization, it is desirable to use heat to initiate polymerization rapidly.

It should be noted that the organoborane initiator, the decomplexing component, the radical curable component, and the developing medium, can be deposited onto the substrate in any combination. Further, the organoborane initiator, the decomplexing component, the radical curable component, and the developing medium can be deposited onto the substrate in any manner that is capable of forming the gradient pattern. For example, any number of well established methods, including pipetting, manual writing, typewriting, gravure printing, engraving, thermography, rubber stamping, screen printing, pad printing, stencil printing, or inkjet printing may be used. Typically, the organoborane initiator, the radical curable component, and/or the decomplexing component are deposited by printing onto the substrate, optionally in the presence of the developing medium. The printing may be further defined as digital printing, one example of which is ink-jet printing. As with microlithographic methods, the composition may be developed or cured to yield either a positive or negative tone image for subsequent processing.

Preferably, the decomplexing component and the radical curable component are not intimately mixed together in the presence of the developing medium prior to developing. For example, in one embodiment, at least one of the organoborane initiator and the radical curable component is deposited separate from the other. In another embodiment, at least one of the organoborane initiator, the decomplexing component, and the radical curable component is deposited separate from the others. It is contemplated that the organoborane initiator, the radical curable component, and optionally the decomplexing component may be deposited on the substrate simultaneously in space and/or time or separately from one other in space and/or time. In one embodiment, the organoborane initiator, the radical curable component, and optionally the decomplexing component are deposited separately from one another but at the same time, e.g. in different streams. Alternatively, the organoborane initiator, the radical curable component, and optionally the decomplexing component may be deposited separately from one another at different times but on the same portion of the substrate. The method may be carried out by depositing the organoborane initiator onto the substrate before the decomplexing component and/or radical curable component. Alternatively, the method may be carried out by depositing the radical curable component and the organoborane initiator, and then depositing the decomplexing component onto the substrate. Alternatively still, the method may be carried out by depositing the decomplexing component onto the substrate before the organoborane initiator and the radical curable component. In another embodiment, the composition is further defined as including a first mixture including the organoborane initiator and a first radical curable component (e.g. first radical curable monomer) and a second mixture including a second radical curable component (e.g. a second radical curable monomer) and the decomplexing component while the step of depositing is further defined as depositing the first and second mixtures onto the substrate. The first and second mixtures may be deposited on the substrate simultaneously or separately in time and/or space.

The composition may be deposited onto the substrate either post-hoc, via a surface functionalization step such as selective priming, via UV or corona treatment to create amine-reactive, or in-situ via a self assembly process during processing of the substrate. Here, the decomplexing component may be present in the substrate either inherently or as an additive. Alternatively still, the method may be carried out by depositing the radical curable component onto the substrate before the organoborane initiator and/or the decomplexing component.

When at least one of the organoborane initiator, the radical curable component, and/or the decomplexing component are deposited separate from the other of the components, one or more of these are generally provided in separate solutions. For example, in one embodiment, a first solution including the radical curable component and the organoborane initiator, and a second solution including the decomplexing component are provided. Both solutions are typically air stable, but after the first solution is deposited onto the substrate in the pattern, the pattern develops rapidly to solidify the pattern when the pattern is exposed to the second solution in ambient conditions. In another embodiment, the organoborane initiator or the decomplexing component, or both, can be encapsulated or delivered in separate phases. This can be accomplished by introducing one or both of the organoborane initiator and the decomplexing component in a solid form that prevents intimate mixing of those components. Development of the pattern can be activated by (a) heating it above the softening temperature of the solid phase component or encapsulant, or (b) by the introduction of a solubilizing agent for the solid phase that allows mixing of the organoborane initiator and the decomplexing component. In yet another method, a heterophase liquid solution such as an emulsion is used, in which the organoborane initiator and the decomplexing component are present together but in separate liquid phases. The pattern may then be developed physically such as by shear or heating to break the emulsion, or chemically by exposing the pattern to a compound that causes the organoborane initiator and the decomplexing component to contact each other and react. The organoborane initiator and the decomplexing component can also be combined in a single container without significant development by packaging the two components where mixing conditions are anaerobic. In this case, pattern development can be initiated by introduction of oxygen to the composition.

In the embodiments where the organoborane initiator, the radical curable component, and/or the decomplexing component are provided in separate solutions, the organoborane initiator and the decomplexing component are typically isolated from one another until after the pattern has been formed on the substrate with one of the solutions. The pattern is then typically developed in place upon exposure of the organoborane initiator and the decomplexing component to each other in the presence of the developing medium, without the need for heating or radiation. However, heating or radiation may still be used in this invention.

The gradient pattern is formed on the substrate by depositing the composition on the substrate wherein at least one of the organoborane initiator and the radical curable component is deposited onto the substrate in the form of the gradient pattern. In one embodiment, the gradient pattern is formed on the substrate by depositing the decomplexing component, either in combination or apart from at least one of the organoborane initiator and the radical curable component, onto the substrate in the form of the gradient pattern. The remaining components, if any, may be deposited either simultaneously or separately, and may be deposited in different patterns. The composition may then developed by exposure to either a chemical agent such as a de-emulsifier or solvent, or to physical processes such as shearing, irradiation, heating, cooling, pressurization, or depressurization, to cause the organoborane initiator and the decomplexing component to come into contact with one another in the presence of the developing medium. For example, where the organoborane initiator, the radical curable component, and/or the decomplexing component are provided in separate solutions, the first solution including the organoborane initiator and the radical curable component may be deposited onto the substrate to form the gradient pattern. The method of deposition may be as simple as hand-lettering with a brush or a fine-tipped applicator, or for finer resolution, it can be transferred via a rubber stamp wetted with the ink, stencil or screen printed, or printed out of an inkjet printer with a cartridge filled with the first solution. The resulting pattern may then be heated to activate the organoborane initiator or be developed by exposure of the substrate including the pattern formed by the first solution to an environment rich in the decomplexing component, such as by dipping in a bath of the decomplexing component, by passing the substrate through a chamber in which the vapor space contains the decomplexing component, by passing the substrate through a fluidized bed of solid particles bearing the decomplexing component, or by overprinting the pattern with an inkjet printer having a cartridge filled with a solution containing the decomplexing component, in the presence of the developing medium, or followed by exposure to the developing medium. In such multi-package systems, the method of exposing the substrate including the pattern formed thereon to the second solution may be done in several ways such as via immersion of the entire substrate, by dipping in a bath, exposing to a vapor chamber, or selectively exposing the pattern such as by over-spraying the pattern from another inkjet cartridge containing the second solution. It may be convenient to use an inkjet printing cartridge with separate reservoirs, as exemplified by a multi-colored inkjet cartridge, or two separate cartridges on a single printer carriage, to separately store the first solution, the second solution, and/or the developing medium, and to allow application and development of the pattern, simply by mixing the components in the process of inkjet printing.

As is known in the art, an inkjet printer can dispense droplets from a printhead with lateral spacing between rows of the droplets defined by a pitch of a nozzle plate. To prepare a continuous film, an appropriate substrate may be selected to allow the droplets to wet the substrate and spread. Alternatively, multiple passes over a single area of a substrate can be made using the inkjet printer while offsetting the printhead (e.g. by 50 microns) per pass. Alternatively, gradient patterns can be printed wherein a density of deposited components can vary across the substrate.

Pre-attachment of the organoborane initiator to monolithic, i.e., continuous rather than particulate, surfaces can be performed in the embodiment of the invention where the organoborane initiator is deposited onto the substrate, followed by deposition of the decomplexing component. For example, an organoborane initiator having an alkoxysilyl group such as 3-aminopropyltriethoxysilane, complexed with an equimolar amount of triethylborane, may be pre-attached to a substrate such as gold or glass by relying on the strong interaction or reactivity between the substrate and the organoborane initiator. The pre-attachment may be performed selectively in the gradient pattern, or as a general treatment or priming provided at least one of the remaining components of the composition is deposited in the desired pattern. As described above, the radical curable component can be deposited together with either the organoborane initiator or the decomplexing component, or both in this embodiment. To control the pattern formation and adhesion on the substrate, it may be desirable to use a combination of low and high surface energy organoborane initiators in the composition.

Pre-attachment of the decomplexing component to monolithic, i.e., continuous rather than particulate, substrates can be performed in the embodiment of the invention where the decomplexing component is deposited onto the substrate, followed by deposition of the organoborane initiator. For example, an organonitrogen- or amine-reactive compound having an alkoxysilyl group such as 3-isocyanopropyl trimethoxysilane may be pre-attached to a substrate such as gold or glass, by relying on the strong interaction or reactivity between the substrate and the organonitrogen- or amine-reactive compound. The pre-attachment may be carried out selectively in the desired pattern, or as a general treatment or priming provided at least one of the remaining components of the composition is deposited in the desired pattern. As described above, the radical curable component can be deposited together with either the organoborane initiator or the decomplexing component, or both in this embodiment. To control the pattern formation and adhesion on the substrate, it may be desirable to use a combination of low and high surface energy organonitrogen-reactive compounds in the composition.

The organoborane initiator, the radical curable component, and/or the decomplexing component may be deposited simultaneously. As described above, the terminology "simultaneously", may include the deposition of the organoborane initiator, the radical curable component, and/or the decomplexing component at the same time, in the same place, or at the same time in the same place. In this embodiment, the organoborane initiator, the radical curable component, and/or the decomplexing component may exist in a single solution and may be deposited together onto the substrate. The organoborane initiator and the decomplexing component are typically isolated from one another by being present in separate phases of a multiphase system such as an emulsion, or via encapsulation of at least one of the organoborane initiator or the decomplexing component. Here, because the organoborane initiator and the decomplexing component are in separate phases, it is not necessary to store and process the composition in the absence of the developing medium, such as oxygen. The composition may be deposited onto the substrate, then developed either by exposure to the developing medium including a chemical agent such as a de-emulsifier or solvent, or by exposure to a physical process such as shearing, irradiation, heating, cooling, pressurization, or depressurization, when oxygen is used as the developing medium, to cause the organoborane initiator and the decomplexing component to come into intimate contact with one another in the presence of the oxygen. Alternatively, the organoborane initiator, the radical curable component, and/or the decomplexing component may be kept separate up until deposition, as set forth above when the components are separately deposited onto the substrate.

In the embodiment, the organoborane initiator, the decomplexing component, and the radical curable component are combined together to form the composition that is deposited in the gradient pattern onto the substrate, all in an environment free of the developing medium, e.g. in an oxygen free atmosphere. Blankets of gases such as nitrogen, carbon dioxide, or noble gases may be used. The gradient pattern is then developed by exposure of the composition to an environment containing the developing medium, such as air including oxygen. In another embodiment, the organoborane initiator and the decomplexing component are isolated from one another by being present in separate phases of a multiphase system such as an emulsion or via encapsulation of at least one of the organoborane initiator and the decomplexing component, as described above.

It is to be appreciated that the organoborane initiator, the radical curable component, and/or the decomplexing component may be deposited in the presence of oxygen as the developing medium to develop the gradient pattern on the substrate. Typically, oxygen is inherently present in the form of air, but it may be deliberately excluded from or introduced to the composition, the developing medium, or a processing environment surrounding the composition on the substrate. For example, an inert gas purge may be used to accelerate curing. In some cases, some of the organoborane initiator, the radical curable component, and/or the decomplexing component may be deposited in the absence of the developing medium, while other components may be deposited in the presence of the developing medium. For example, when one or more of the organoborane initiator, the radical curable component, and/or the decomplexing component are deposited before the others, the first to be deposited may be deposited in the absence of the developing medium, while the rest may be deposited in the presence of the developing medium. Alternatively, when the organoborane initiator, the radical curable component, and/or the decomplexing component are deposited simultaneously, the organoborane initiator, the radical curable component, and/or the decomplexing component may be deposited in the absence of the developing medium, such as oxygen. Once on the substrate, the composition may then be exposed to the developing medium including oxygen, such as air, to develop or cure the composition on the substrate in the desired pattern, i.e., in the form of the gradient pattern.

Development typically occurs upon mixing of the organoborane initiator, the radical curable component, and the decomplexing component with the developing medium. The deposition of the organoborane initiator, the radical curable component, and/or the decomplexing component onto the substrate may be physical, i.e., through adsorption, or it may involve the formation of covalent bonds with the surface, i.e., through grafting. As opposed to purely physical patterning methods, the composition of the present invention undergoes an increase in average molecular weight via free radical polymerization during development, such as from a monomeric or macromonomeric fluid to a polymer film. In this respect, development of the composition of the present invention is similar to lithographic techniques based upon photopolymerization, but it does not require photoinitiators or a light source.

Because the organoborane initiator, the radical curable component, and/or the decomplexing component of the composition may be distributed in various manners in the several embodiments, their relative amounts can vary widely. For example, when the organoborane initiator, the radical curable component, and/or the decomplexing component are included in separate solutions, the developing medium may contain a large excess of one particular compound to allow multiple samples of a pattern, including the remaining compounds of the composition and the substrate, to be developed by passing through the developing medium in a continuous or semi-continuous process. However, the amount of the developing medium needed to develop just one pattern may be hundreds of times smaller. The organoborane initiator is typically deposited in an amount of from about 0.1 to about 50 parts by weight, more typically from about 0.5 to about 30 parts by weight, per 100 parts by weight of the composition. The decomplexing component is typically deposited in an amount of from about 0.1 to about 50 parts by weight, more typically from about 0.2 to about 40 parts by weight, per 100 parts by weight of the composition. The radical curable component is typically deposited in an amount of from about 0.1 to about 99.9 parts by weight, more typically from about 1 to 99 parts by weight, per 100 parts by weight of the composition. The developing medium typically includes oxygen in an amount of from 0.0001 to infinite parts by weight, per 100 parts by weight of the composition. The optional components may be used in an amount of from 0 to about 99 parts by weight, more typically from about 0.1 to about 80 parts by weight, per 100 parts by weight of the composition. In any case, the amounts may be scaled to accommodate any convenient mass or volume. The range of oxygen is essentially unlimited, since oxygen can be present in any environment such as air.

In one embodiment, the development rate of the composition can be controlled by introducing additional amines to increase a molar ratio of amine groups to boron atoms in the composition. The effective amount of the additional amine to be added depends on the amine:boron ratio used in the organoborane initiator. It is preferred that the overall amine:boron ratio remains sufficiently low, however, to permit development to occur. A suitable amine:boron ratio is typically less than about 10:1, preferably less than about 4:1. When the decomplexing component is already present in the composition prior to deposition, i.e., when residual carboxylic acid is present on optional filler particles, higher levels of amine compounds are typically added to neutralize or partially neutralize the amine reactive groups in the decomplexing component to reduce the development rate. The additional amine may contain monofunctional or multifunctional amine groups, and it can be a primary amine, a secondary amine, and/or a tertiary amine. If desired, the amine can contain radical polymerizable groups or another functional group such as a hydrolyzable group. The additional amine can be monomeric, oligomeric, or polymeric in nature. Amine groups in the additional amine may be borne on an organic, organosilicon, or organopolysiloxane compound.

The substrate on which the composition is deposited is not limited. Examples of suitable substrates include glass surfaces, metal surfaces, quartz surfaces, ceramic surfaces, silicon surfaces, organic surfaces, rigid polymeric surfaces, flexible elastomeric surfaces, or composite surfaces thereof. The substrates can be multi-layered substrates, such as substrates used in printed circuit boards, in which improved adhesion is desired between the curable pattern and the substrate or substrates of the composite article. Some specific examples of substrates include silicon, silica, alumina, cerium oxide, glass, gold, platinum, palladium, rhodium, silver, steel, stainless steel, anodized steel, aluminum, anodized aluminum, cast aluminum, titanium, nickel, copper, brass, and oxides thereof; circuit boards; polyethylene, polypropylene, polystyrene, syndiotatic-polystyrene, polybutylene terephthalate, polycarbonate, polyphthalamide; polyphenylene sulfide; epoxy resins; bis-maleimide triazine resins; fluoropolymers such as polytetrafluoroethylene, natural rubber, latex rubbers, silicone, fluorosilicone, pressure sensitive tapes and adhesives; and cellulosic polymers such as wood, paper, and other natural polymers.

The substrate may also be a frozen liquid, such as ice or dry ice, to create freely standing templates or decals that may be transferred to another substrate by allowing the substrate to melt after the pattern has been created. The substrate may also be a liquid surface, such as water, heptane, silicone oil, or mercury, provided the composition retains the desired features of the pattern until development is complete. In cases where it is desirable to form freely standing patterns such as for transfer as decals, one may deposit the composition onto the surface of substrates that are meltable or sublimable solids such as ice or dry ice, or liquid substrate surfaces such as water, oil, or liquid organopolysiloxane, provided the surface does not dissolve the desired pattern, or otherwise impair development of the desired pattern. In these instances, it may be convenient to deposit the decomplexing component by imbibing it into the substrate, as exemplified by dissolving of acrylic acid or polyacrylic acid into water or ice. Preferably, the composition does not spread or dissolve in the liquid surface when applied to the liquid surface.

The resulting properties of the developed or cured composition are not particularly limited. For example, the composition can be formulated to yield a gradient pattern that may be rigid, flexible, transparent, translucent, opaque, elastomeric, amorphous, semi-crystalline, liquid crystalline, thermoplastic, thermosetting, thermally or electrically insulating, thermally or electrically semi-conductive, or thermally or electrically conductive. Formation of the gradient pattern enables characterization of the composition and testing of the resulting properties of the developed or cured composition.

After the composition on the substrate is developed or cured, i.e., after the organoborane initiator, decomplexing component, and/or radical curable component react, the developed composition may be analyzed. The developed composition may be analyzed to determine any range of desired chemical, surface and physical properties. For example, properties such as extent of cure, hardness, adhesion, abrasion resistance, glass transition temperature, melting temperature, miscibility, transparency, roughness, surface elemental, molecular or functional group concentration may be analyzed via a range of techniques. Non-limiting examples of such techniques include various spectroscopies including infrared spectroscopy, attenuated total reflectance infrared spectroscopy, Raman spectroscopy, infrared microscopy, UV-Vis spectroscopy, and x-ray photoelectron spectroscopy, microscopies such as optical, scanning electron, and transmission electron microscopy, adhesion tests, nanoindentation tests, microindentation tests, digestion techniques, chemical titration tests, tape-pull off tests, contact mechanical adhesion tests, thermal shock tests, AFM calorimetry, colorimetry, and known methods for testing electrical and thermal conductance, resistance, and calorimetry. Alternatively, the developed composition may be analyzed using manual smearing and/or visual inspection. Manual smearing includes smearing or smudging the composition with a gloved finger to test whether the composition is developed/cured. The composition is typically analyzed at a predetermined location of the gradient pattern, where the relative amounts of the components are known. Additionally, the instant invention may include any or all of the disclosure of International Application Number: PCT/US2006/030192, which in its entirety, is incorporated herein by reference.

The following examples are meant to illustrate, and not to limit, the scope of the present invention.

EXAMPLES

Figure 1B:
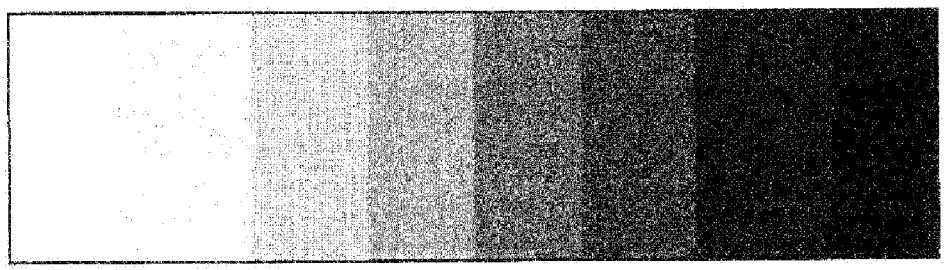
FIG. 1b is an image of another gradient pattern illustrating discrete pixels based on inkjet droplet volume and is created from FIG. 1a using an Adobe Photoshop® plug in commercially available from Xaar®.

A gradient pattern is prepared using Adobe Photoshop® Elements software. The gradient pattern is 319 pixels wide by 1200 pixels long, and increases progressively from 100 to 0% black. An image of this gradient pattern is set forth as FIG. 1a. An Adobe Photoshop® plug-in, commercially available from Xaar®, is used to convert the gradient pattern of FIG. 1a into another gradient pattern including discrete pixels based on inkjet droplet volume. An image of this gradient pattern is set forth as FIG. 1b. The gradient pattern of FIG. 1b can be printed at eight different drop volumes using an Omnidot 318 printhead. The gradient pattern of FIG. 1b is then converted with the same Adobe Photoshop® plug-in to yet another gradient pattern to be printed. An image of this gradient pattern is set forth as FIG. 1c. This gradient pattern is based on inkjet droplet volume and droplet placement. The gradient patterns are saved as a bitmap files at 300 pixel resolution and 24 bit color.

Figure 1C:
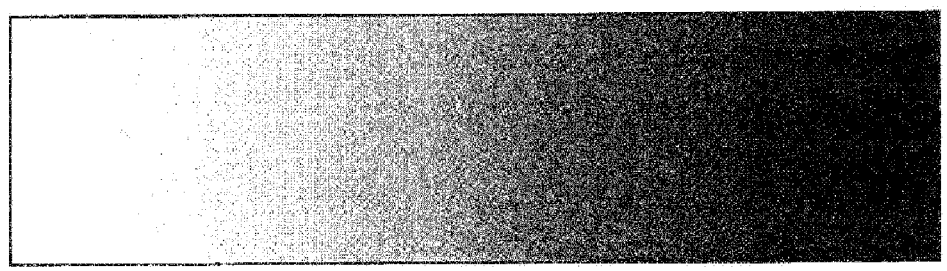
FIG. 1c is an image of yet another gradient pattern based on inkjet droplet volume and droplet placement on a substrate and is developed from FIG. 1b using the Adobe Photoshop® plug in commercially available from Xaar®.
Figure 2A:
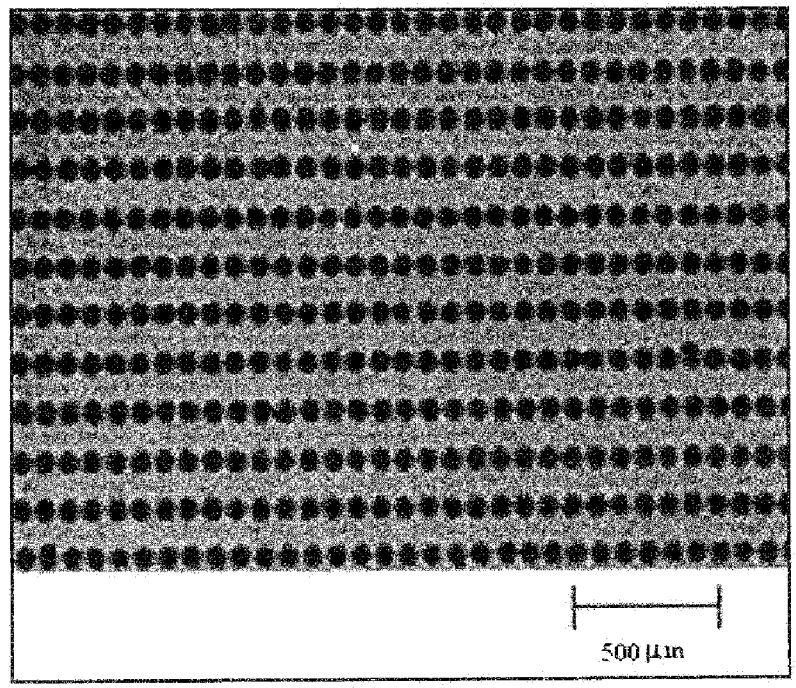
FIG. 2a is an optical micrograph of droplets of commercially available black ink dispensed onto photopaper in a single pass using a Xenjet® 4000 industrial inkjet printer illustrating that the inkjet printer prints rows of droplets with only a single pass.
Figure 2B:
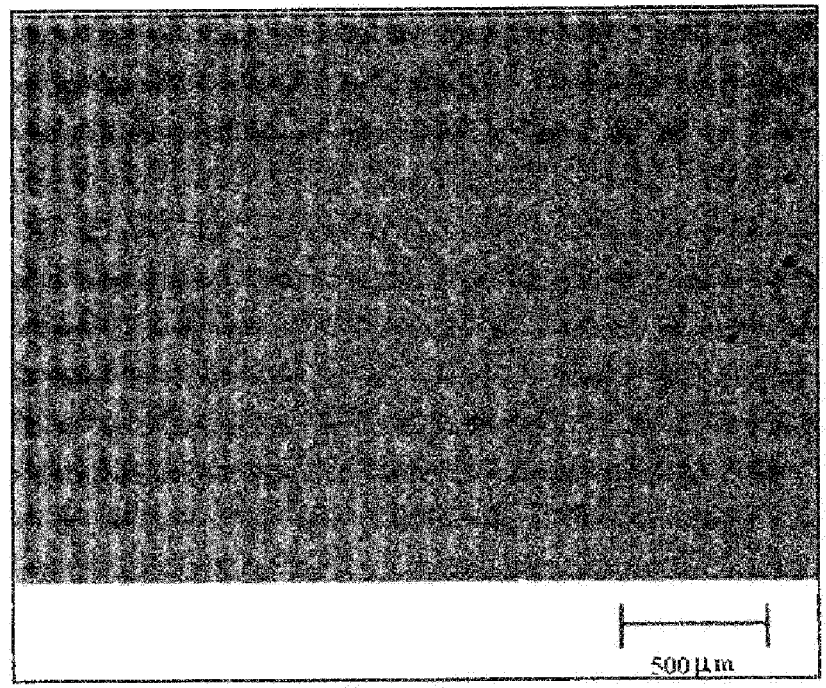
FIG. 2b is an optical micrograph of a continuous film formed from droplets of commercially available black ink dispensed onto photopaper in four passes using the Xenjet® 4000 industrial inkjet printer and a printhead that is offset 50 µm per pass illustrating that the inkjet printer can form a continuous film using multiple passes.

To initially evaluate the gradient pattern of FIG. 1c to be printed, a Xenjet® 4000 industrial inkjet printer is used to dispense droplets of commercially available black ink onto a substrate (i.e., photopaper) in a single pass. As is well known in the art of inkjet printing, the droplets are dispensed onto the substrate with lateral spacing between droplets (i.e. spacing between rows of droplets on the substrate) that is defined by a pitch (e.g. ~169 µm) of a nozzle plate of the inkjet printer. An illustrative example of droplets of black ink dispensed onto photopaper as rows of droplets, as viewed through an optical microscope, is set forth as FIG. 2a. A continuous film of droplets is set forth as FIG. 2b as also viewed through an optical microscope, and may be prepared by customizing the substrate to allow the droplets to more completely wet and spread out. The inkjet printer may also make multiple passes (e.g. ~4) over a single area of the substrate with a slightly offset printhead (e.g. ~50 µm) per pass to dispense the droplets onto the substrate and form the continuous film.

Figure 3:
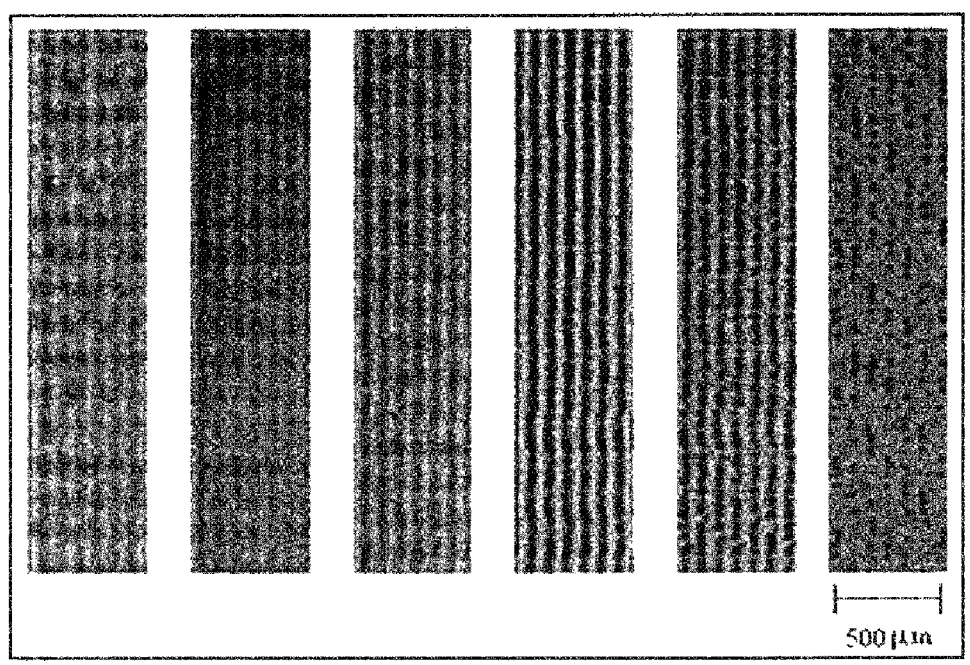
FIG. 3 is a collection of optical micrographs of the gradient pattern of FIG. 1c printed onto photopaper in four passes using commercially available black ink, the Xenjet® 4000 industrial inkjet printer, and a printhead that is offset 50 µm per pass illustrating that a density of deposited ink decreases from left to right across the photopaper and across the micrographs and that this gradient pattern printed with this inkjet printer can be used to form a gradient pattern in the instant invention.

The gradient pattern of FIG. 1c is printed onto photopaper using the Xenjet® 4000 inkjet printer and a single commercially available black ink. The inkjet printer makes four passes over a single area of the photopaper utilizing a printhead that is offset 50 µm per pass. The printed gradient pattern is evaluated to determine ink density every 20 mm intervals along the gradient pattern using an optical microscope. The results of this evaluation, set forth as the optical micrographs in FIG. 3, indicate that a density of deposited ink decreases from left to right across the photopaper and across the micrographs. The optical micrographs illustrate that the Xenjet® 4000 inkjet printer successfully prints gradient patterns.

A Xenjet® 4000 industrial inkjet printer having two printheads commercially manufactured by Xaar® is used to print the gradient pattern of FIG. 1c onto a substrate in a nitrogen purged atmosphere to minimize oxygen inhibition. More specifically, a first printhead includes an organoborane-amine complex as the organoborane initiator and a radical curable component including a mixture of a first and a second radical polymerizable (curable) monomer. A second printhead includes a decomplexing component and an additional amount of the first radical polymerizable monomer. The specific identities of the organoborane-amine complex, the first and second radical polymerizable monomers of the radical curable component, and decomplexing component are set forth in Table 1 below.

TABLE 1

| | Weight Percent (%) | Commercial Supplier |
|---|---|---|
| First Printhead | | |
| Butylene glycol dimethacrylate ($1^{st}$ monomer of the radical curable component) | 65.3 | Ciba |
| Trimethylolpropane trimethacrylate ($2^{nd}$ monomer of the radical curable component) | 24 | Ciba |
| Tributylborane-methoxypropylamine (organoborane-amine complex) | 10 | Akzo Nobel |
| Orcosolve Black RE dye | 0.5 | Orco |
| BNX-2000 hydroxyl amine stabilizer | 0.2 | Mayzo |

TABLE 1-continued

| | Weight Percent (%) | Commercial Supplier |
|---|---|---|
| Second Printhead | | |
| Butylene glycol dimethacrylate (1st monomer of the radical curable component) | 69.5 | Ciba |
| 2-carboxyethyl acrylate (decomplexing component) | 30 | Ciba |
| Orcosolve Black RE dye | 0.5 | Orco |

To initially evaluate the ability of the Xenjet® 4000 industrial inkjet printer and the two printheads to dispense the organoborane-amine complex, the radical curable component, and decomplexing component onto the substrate, and to ensure that curing can occur on the substrate, a 100% black image is printed on an uncoated side of a polyethylene terephthalate (PET) inkjet transparency using the first and second printheads simultaneously. Four passes are made by the inkjet printer over the PET inkjet transparency with the first and second printheads offset by 50 μm per pass. These passes form a film of overlapping droplets of the organoborane-amine complex, the radical curable component, and decomplexing component. The droplets mix on the surface of the PET inkjet transparency resulting in polymerization of the first and second radical polymerizable monomers of the radical curable component and curing of the film. The cured film does not include any residual amount of either the first or second radical polymerizable monomers of the radical curable component. The formation of the cured film indicates that the Xenjet® 4000 inkjet printer successfully dispenses the organoborane-amine complex, the radical curable component, and decomplexing component onto the substrate and that cure can occur on the substrate.

Example 1

The gradient pattern of FIG. 1c is printed on an uncoated side of a polyethylene terephthalate (PET) inkjet transparency using the Xenjet® 4000 industrial inkjet printer utilizing the first printhead. Four passes are made over the PET inkjet transparency while offsetting the first printhead by 50 μm per pass. Then, a 100% black image is printed on top of the gradient pattern utilizing the second printhead. Four passes are made over the gradient pattern while offsetting the second printhead by 50 μm per pass. The printing occurs in a nitrogen purged atmosphere to minimize oxygen inhibition. The four passes from each of the first and second printheads results in different mix ratios of the organoborane-amine complex, the first and second radical polymerizable monomers of the radical curable component, and the decomplexing component across the PET inkjet transparency. After printing, a portion of the gradient pattern that includes the highest concentration of the organoborane-amine complex is determined to be well cured through visual evaluation. A portion of the gradient pattern with the lowest concentration of the organoborane-amine complex is determined to be uncured through visual evaluation and is easily rubbed off of the PET inkjet transparency using a nitrile rubber gloved finger and manual smearing.

Example 2

The gradient pattern of FIG. 1c is also printed on an uncoated side of a polyethylene terephthalate (PET) inkjet transparency using the Xenjet® 4000 industrial inkjet printer utilizing the second printhead. Four passes are made over the PET inkjet transparency while offsetting the second printhead by 50 μm per pass. Then, a 100% black image is printed on top of the gradient pattern utilizing the first printhead. Four passes are made over the gradient pattern while offsetting the first printhead by 50 μm per pass. The printing occurs in a nitrogen purged atmosphere to minimize oxygen inhibition. The four passes from each of the first and second printheads results in different mix ratios of the organoborane-amine complex, the first and second radical polymerizable monomers of the radical curable component, and the decomplexing component across the PET inkjet transparency. After printing, a portion of the gradient pattern that includes the highest concentration of the decomplexing component is determined to be well cured through visual evaluation. A portion of the gradient pattern with the lowest concentration of the decomplexing component is determined to be uncured through visual evaluation and is easily rubbed off of the PET inkjet transparency using a nitrile rubber gloved finger and manual smearing.

Example 3

An Epson Stylus Photo R220 office inkjet printer is used to form a gradient pattern on a substrate. More specifically, two empty fluid cartridges are purchased and filled separately with a solution of about 100 wt % acrylic acid in the first cartridge and a solution of about 5 wt % triethylborane-propanediamine (TEB-PDA) in isopropanol in the second cartridge. In this Example, the acrylic acid functions as both the radical curable component and the decomplexing component. An image is prepared in Microsoft Paint that contains discrete portions of a gradient pattern corresponding to surface coverages of acrylic acid of from 100 to 0% overlaid on a pattern of surface coverage of from 0 to 100% for TEB-PDA. The color of the pattern corresponds to the color of the fluid cartridge that contains the acrylic acid. The solution is printed onto an inkjet transparency resulting in a pattern of acrylic acid and TEB-PDA mixtures with surface coverage varying according to the gradient pattern. After printing, a portion of the gradient pattern that includes the highest concentration of the TEB-PDA is determined to be well cured through visual evaluation. A portion of the gradient pattern with the lowest concentration of the TEB-PDA is determined to be uncured through visual evaluation.

Examples 1-3 demonstrate that the method of the instant invention can be used to quickly determine a proper mixing ratio of the organoborane initiator, the radical curable component, and optionally, the decomplexing component, to form an article having a gradient pattern formed thereon. These Examples also demonstrate that this method can be used to rapidly screen a range of compositions to determine various performance properties such as extent of cure. It is readily envisioned that various surface analytical techniques and property measurement techniques may be used to correlate properties and compositions with various positions along gradient patterns.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. An article comprising:
   a substrate; and
   a developed composition deposited on said substrate, said developed composition comprising the reaction product of (i) an organoborane initiator and (ii) a radical curable component, wherein said developed composition is formed from depositing at least one of (i) said organoborane initiator and (ii) said radical curable component in a gradient pattern on said substrate.

2. An article as set forth in claim 1 wherein said developed composition is further defined as comprising the reaction product of (i) said organoborane initiator, (ii) said radical curable component, and (iii) a decomplexing component.

3. An article as set forth in claim 2 wherein (i) said organoborane initiator is further defined as a complex of an organoborane and an amine.

4. An article as set forth in claim 1 wherein said gradient pattern, prior to reaction, is further defined as surface coverage of at least one of (i) said organoborane initiator and (ii) said radical curable component on said substrate increasing progressively from 0 to 100% along a first axis.

5. An article as set forth in claim 4 wherein said gradient pattern is further defined as surface coverage of (iii) a decomplexing component on said substrate increasing progressively from 0 to 100% along a second axis transverse to said first axis.

6. An article as set forth in claim 1 wherein (ii) said radical curable component comprises a radical curable organosilicon compound.

7. An article as set forth in claim 6 wherein (ii) said radical curable organosilicon compound is selected from the group of an organosilane, an organopolysiloxane, and combinations thereof.

8. An article as set forth in claim 1 wherein (ii) said radical curable component comprises an acrylic compound.

9. An article as set forth in claim 1 wherein (ii) said radical curable component is capable of undergoing free radical polymerization.

10. An article as set forth in claim 1 wherein (i) said organoborane initiator is further defined as a complex of an organoborane and an amine and wherein said organoborane has the general structure:

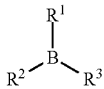

wherein each of $R^1$-$R^3$ is independently selected from a group of a hydrogen atom, an aliphatic hydrocarbon group, and an aromatic hydrocarbon group, with each of said hydrocarbon groups independently having from 1 to 20 carbon atoms.

11. An article as set forth in claim 10 wherein said organoborane is selected from the group of tri-methylborane, tri-ethylborane, tri-n-butylborane, tri-n-octylborane, tri-sec-butylborane, tridodecylborane, phenyldiethylborane, and combinations thereof.

12. An article as set forth in claim 11 wherein said amine is selected from the group of amine-functional silanes, amine-functional organopolysiloxanes, and combinations thereof.

13. An article as set forth in claim 2 wherein (iii) said decomplexing component is further defined as an organonitrogen reactive compound that is selected from the group of isophorone diisocyanate, acrylic acid, methacrylic anhydride, undecylenic acid, citraconic anhydride, polyacrylic acid, and combinations thereof.

14. An article as set forth in claim 2 wherein (iii) said decomplexing component comprises 2-carboxylethylacrylate.

15. An article as set forth in claim 2 wherein (i) said organoborane initiator is present in said developed composition in an amount to provide a concentration of boron ranging from 100 to 10000 parts by weight, per one million weight parts of said radical curable component in said developed composition.

16. An article as set forth in claim 2 wherein said substrate comprises glass, metal, quartz, ceramic, organic, rigid polymeric, or elastomeric surfaces.

17. An article as set forth in claim 2 wherein said gradient pattern is a gradient in composition of (i) said organoborane initiator and/or (ii) said radical curable component.

18. An article as set forth in claim 2 wherein (i) said organoborane initiator is deposited onto said substrate separately from (ii) said radical curable component.

19. An article as set forth in claim 2 wherein (i) said organoborane initiator is deposited onto said substrate simultaneously as (ii) said radical curable component.

20. An article comprising:
    a substrate; and
    a developed composition deposited on said substrate, said developed composition comprising the reaction product of (i) an organoborane initiator, (ii) a radical curable component, and (iii) a decomplexing component, wherein said developed composition is formed from depositing at least one of (i) said organoborane initiator, (ii) said radical curable component, and (iii) said decomplexing component in a gradient pattern on said substrate.

21. An article as set forth in claim 20 wherein said gradient pattern is further defined as surface coverage of at least one of (i) said organoborane initiator, (ii) said radical curable component, and (iii) said decomplexing component on said substrate increasing progressively from 0 to 100% along a first axis.

22. An article as set forth in claim 21 wherein said gradient pattern is further defined as surface coverage of at least one of (i)-(iii) on said substrate increasing progressively from 0 to 100% along a second axis transverse to said first axis, so long as said at least one of (i)-(iii) along said second axis is not the same as said at least one of (i)-(iii) along said first axis.

* * * * *